(12) United States Patent
Kollar et al.

(10) Patent No.: US 10,728,953 B2
(45) Date of Patent: Jul. 28, 2020

(54) INACTIVITY TIMER EVALUATION

(71) Applicant: NOKIA SOLUTIONS AND NETWORKS OY, Espoo (FI)

(72) Inventors: Martin Kollar, Kosice (SK); Yi Zhi Yao, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 82 days.

(21) Appl. No.: 15/752,355

(22) PCT Filed: Aug. 13, 2015

(86) PCT No.: PCT/EP2015/068656
§ 371 (c)(1),
(2) Date: Feb. 13, 2018

(87) PCT Pub. No.: WO2017/025144
PCT Pub. Date: Feb. 16, 2017

(65) Prior Publication Data
US 2019/0268966 A1 Aug. 29, 2019

(51) Int. Cl.
*H04W 76/38* (2018.01)
(52) U.S. Cl.
CPC .................................. *H04W 76/38* (2018.02)
(58) Field of Classification Search
None
See application file for complete search history.

(56) References Cited

U.S. PATENT DOCUMENTS

| | | | |
|---|---|---|---|
| 2013/0003577 A1* | 1/2013 | Gupta | H04W 52/0225 370/252 |
| 2014/0112223 A1* | 4/2014 | Swann | H04W 52/0251 370/311 |
| 2015/0050935 A1* | 2/2015 | Maniatis | H04W 72/048 455/437 |
| 2015/0117398 A1* | 4/2015 | Yang | H04W 36/0005 370/331 |
| 2015/0373733 A1* | 12/2015 | Bangolae | H04W 36/14 370/329 |
| 2016/0242128 A1* | 8/2016 | Loehr | H04W 52/367 |
| 2018/0316414 A9* | 11/2018 | Ravishankar | H04B 7/18584 |

OTHER PUBLICATIONS

TS 36.413 V13.0.0. 3rd Generation Partnership Project; Technical Specification Group Radio Access Network; Evolved Universal Terrestrial Radio Access Network (E-UTRAN); S1 Application Protocol (S1AP) (Release 13) (Year: 2015).*

(Continued)

*Primary Examiner* — Jeffrey M Rutkowski
*Assistant Examiner* — Andre Tacdiran
(74) *Attorney, Agent, or Firm* — Squire Patton Boggs (US) LLP

(57) ABSTRACT

There are provided measures for inactivity timer evaluation. Such measures exemplarily comprise monitoring a communication related state, determining, upon a first state change indicative of a start of a communication, a duration amount of a period between said first state change and a preceding second state change indicative of an end of a preceding communication, and adjusting a control value based on a distribution of a plurality of determined duration amounts.

11 Claims, 11 Drawing Sheets

(56) References Cited

OTHER PUBLICATIONS

3GPP TS 32.425 V13.2.0. 3rd Generation Partnership Project; Technical Specification Group Services and System Aspects; Telecommunication management; Performance Management (PM); (Year: 2015).*

Jun. 19, 2019 Office Action issued in European Patent Application No. 15763500.4.

3GPP TS 32.425 V13.2.0 (Jun. 2015), Technical Specification, 3rd Generation Partnership Project; Technical Specification Group Services and System Aspects; Telecommunication management; Performance Management (PM); Performance measurements Evolved Universal Terrestrial Radio Access Network (E-UTRAN) (Release 13), Jun. 2015.

* cited by examiner

INACTIVITY TIMER EVALUATION

FIELD

The present invention relates to inactivity timer evaluation. More specifically, the present invention exemplarily relates to measures (including methods, apparatuses and computer program products) for realizing inactivity timer evaluation.

BACKGROUND

The present specification generally relates to inactivity timers triggering the shift of network elements from a kind of an active state (e.g. connected state) to a kind of an inactive state (e.g. idle state).

In $3^{rd}$ Generation Partnership Project (3GPP) Long Term Evolution (LTE) and its successor LTE Advanced (LTE-A), all provided services are of packet switched (PS) type and thus are finished. In case there is no non-GBR E-RAB (GBR: guaranteed bit rate, E-RAB: evolved radio access bearer) any longer established for a terminal like a user equipment (UE), the UE moves to ECM—Idle state (ECM: EPS connection management, EPS: evolved packet system), and RRC—Idle state (RRC: radio resource control) is triggered by inactivity timer expiry at evolved NodeB (eNodeB, eNB) side (unless before the release was already initiated for any cause either by eNB or evolved packet core (EPC) which may include "user inactivity" cause and may also be different from "user inactivity" cause).

The services can be divided into two groups considering the time between a newly successful RRC connection setup and the last (preceding) RRC connection release. The first group is constituted by services in relation to which this considered time (between a newly successful RRC connection setup and the last (preceding) RRC connection release) is quite long (e.g. tens of minutes or hours). The second group is constituted by services in relation to which this considered time (between a newly successful RRC connection setup and the last (preceding) RRC connection release) is e.g. tens of seconds.

A typical example of the service from the first group (first type of service) can be a voice over LTE (VoLTE) call with a common characteristic that
  data transmission is accumulated into the time period the call is active without any long interruptions (pauses), and
  there is a sufficiently long period between two consecutive calls from/for the same UE.

On the other hand, a typical example of the service from the second group (second type of service) can be web browsing with a common characteristic that
  data transmission is accumulated into smaller time periods in which the service is active i.e. with long interruptions/pauses between data transmissions.

In the past, operators had only option to set the inactivity timer commonly for all kind of services.

This may lead to the situation that for the services from the first group, the UE had to spend ineffectively longer time in RRC Connected state which had negative impact on UE's battery live. On the other hand, for the services from the second group, the inactivity timer setting can be insufficient which then may lead to significant increase (in the number) of the UE movements/shifts from RRC Idle state to RRC Connected state.

Presently, two types of inactivity timers are configured for the services from the first and second group, respectively, to overcome the above outlined issue, namely short and long inactivity timers.

Additionally, it is possible to provide more than two groups with services grouped according to QCI characteristics (QCI: QoS class identifier, QoS: quality of service).

It is known that inactivity timers may have influence on several network related quantities which may affect the traffic management effort, the available payload bandwidth, as well as the energy consumption of mobile devices, for example time in RRC connected state after completion of data transmission, number of movements of mobile device to RRC idle state, number of RRC connection setups for the mobile device, etc.

Hence, the problem arises that a flexible configuration of inactivity timers is necessary in order to achieve optimized effects on the mentioned and other network related quantities.

Hence, there is a need to provide for inactivity timer evaluation.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising monitoring a communication related state, determining, upon a first state change indicative of a start of a communication, a duration amount of a period between said first state change and a preceding second state change indicative of an end of a preceding communication, and adjusting a control value based on a distribution of a plurality of determined duration amounts.

According to an exemplary aspect of the present invention, there is provided an apparatus comprising a monitoring circuitry configured to monitor a communication related state, a determining circuitry configured to, upon a first state change indicative of a start of a communication, determine a duration amount of a period between said first state change and a preceding second state change indicative of an end of a preceding communication, and an adjusting circuitry configured to adjust a control value based on a distribution of a plurality of determined duration amounts.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform monitoring a communication related state, determining, upon a first state change indicative of a start of a communication, a duration amount of a period between said first state change and a preceding second state change indicative of an end of a preceding communication, and adjusting a control value based on a distribution of a plurality of determined duration amounts.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient utilization of resources related to mobile communication to thereby solve at least part of the problems and drawbacks identified in relation to the prior art.

By way of exemplary embodiments of the present invention, there is provided inactivity timer evaluation. More specifically, by way of exemplary embodiments of the present invention, there are provided measures and mechanisms for realizing inactivity timer evaluation.

Thus, improvement is achieved by methods, apparatuses and computer program products enabling/realizing inactivity timer evaluation.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
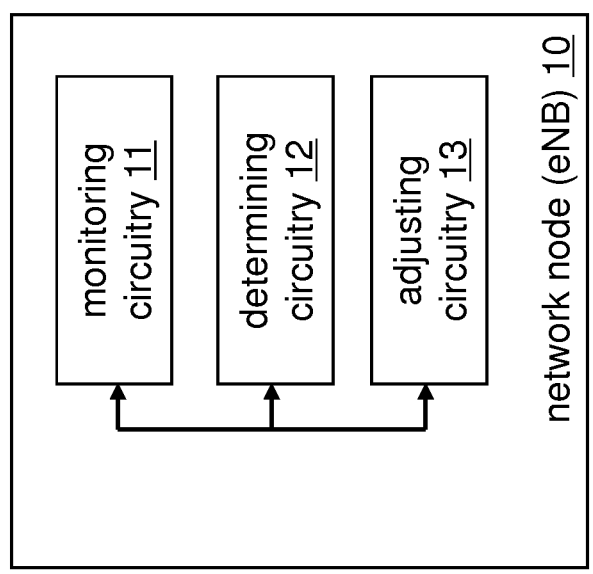
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) inactivity timer evaluation.

It is known to configure the two types of inactivity timers (short and long inactivity timers) without any standardized performance measurements.

The short inactivity timer may be easily adjusted, since this timer is only to be oriented to a bottom value below which the timer shall not be set in order to avoid increased number of RRC connection setups. Hence, the short inactivity timer may be safely set to a couple of seconds which is fairly sufficient for the services with the time between successful RRC connection setup and last (foregoing) RRC connection release in the range of tens of minutes or hours (i.e. services of first type).

Although in view of that the time between successful RRC connection setup and last RRC connection release is in the range of tens of minutes or hours for the services from the first group a short inactivity timer of Zero seconds appears to be suitable, the short inactivity timer can in fact not be directly set to Zero seconds. Namely, even during such services (first type services) some short interruptions/pauses between the data transmission are possible. For example for the VoLTE, the data transmission is done via packets generated each 20 ms except some silent interval where silent insertion descriptor (SID) packets are generated each 160 ms. Even in case of high load cell, packet related transmission can be delayed to tenths of seconds which is still according to QCI1 characteristic. Hence, presently the above mentioned couple of seconds is (arbitrarily) selected for the short inactivity timer.

For configuration of the long inactivity timer, currently just the number of UE releases after long timer expiry due to user inactivity is measured and compared to a decreased number of RRC connection setups.

However regarding the services where the long inactivity timer should apply (second type services), estimation how intended prolongation of the long inactivity timer is going to decrease the number of RRC connection setups on one side and prolong the UEs' state in RRC Connected state on second side is favorable.

The following example shall reveal why such estimation is favorable.

Namely, according to such example, it is assumed that the time between successful RRC connection setup and last RRC connection release is 20 seconds constantly for each service from the second group. It is further assumed that the long inactivity timer is set to 10 seconds. It is further assumed that it is intended to prolong the long inactivity timer to 15 seconds.

Checking these key data it may be estimated that such prolongation does not decrease the number of RRC connection setups but prolong each UE state in RRC Connected state by 5 seconds.

Hence, it may be estimated that such intended measure would not have positive effects on the considered quantities but instead has negative effects thereon. Knowing such result, it can be refrained from prolonging the long inactivity timer to the intended value in that example situation.

The decision on short or long inactivity timer may be done on a per UE basis not on a per E-RAB basis. I.e. the decision to assign the UE (identified by an S-TMSI (S-TMSI: SAE-temporary mobile subscriber identity, SAE: system architecture evolution)) with the long or short inactivity timer is done complexly per the UE as the whole. In case UE has entered the network for the first time and there is no history what is the average time for the UE between the new successful RRC connection setup and last RRC Connection Release the UE is assigned with the short inactivity timer by default.

For describing exemplary embodiments of the present invention, first of all, a type of service from the first group like VoLTE call is considered. As identified above, such first group type has a common characteristic that data transmission is accumulated into the time period the call is active without any long interruptions/pauses and that a sufficiently long period exists between two consecutive calls from/to the same UE. Such UE shall in respect to the first group type service be assigned with the short inactivity timer for the case that the UE does not have any data to transfer.

For these kinds of services it does not make sense to set the short inactivity timer to any long value as it would not significantly affect the time between the new RRC connection setup and the last RRC connection release but would prolong the time for the UE staying at RRC connection state, which would mean more energy consumption.

Figure 6:
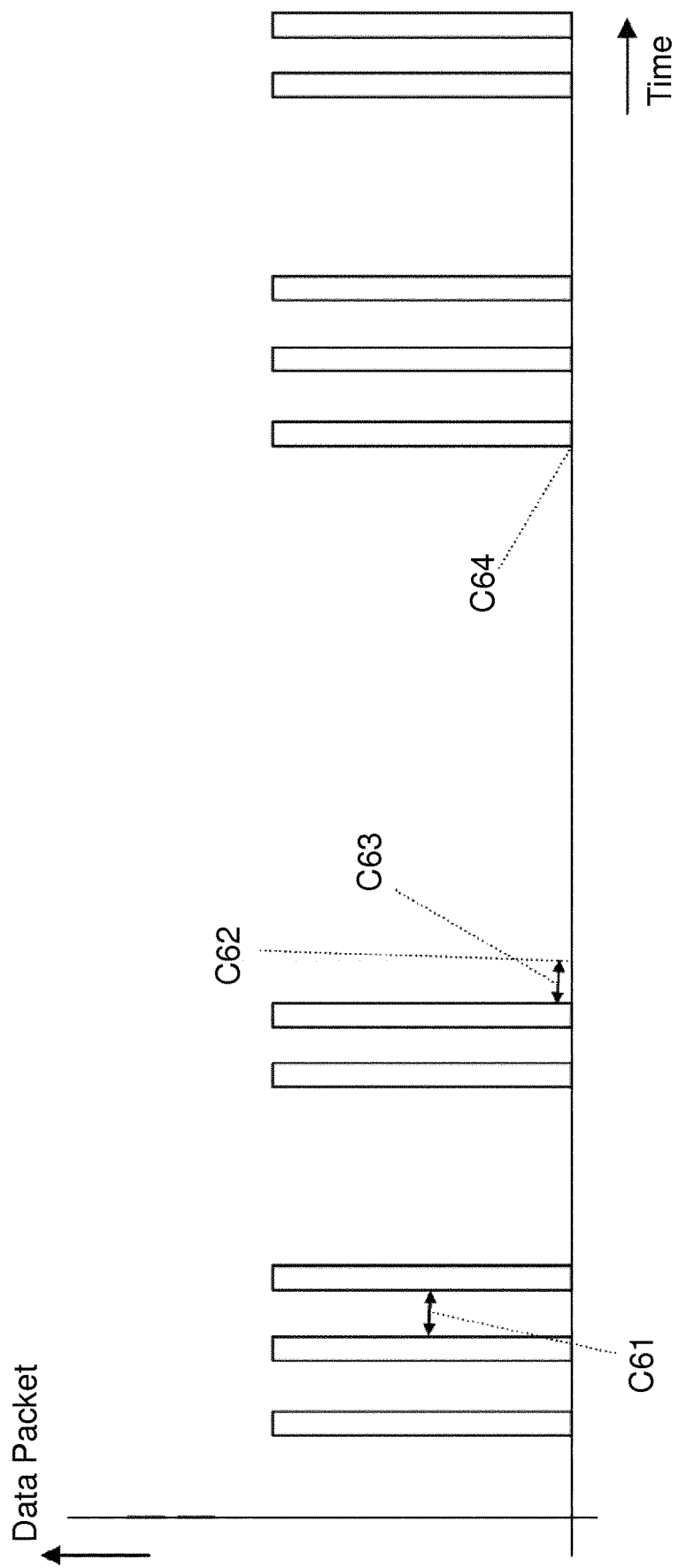
FIG. 6 is a diagram illustrating time behavior characteristic of services from the above mentioned first group.

FIG. 6 is a diagram illustrating time behavior characteristic of services from the above mentioned first group. In particular, FIG. 6 illustrates the periodic generation of data packets for a VoLTE call each 20 ms with some silent interval when SID packets are generated with the 160 ms periodicity, as already discussed above.

FIG. 6 mirrors that data packets for the VoLTE call shall be generated periodically each 20 ms except for some silent interval when SID packets are generated with 160 ms periodicity (C61), mirrors an example short inactivity timer duration (C63), and that the UE has been released after expiry of the example short inactivity timer (C62). FIG. 6 further mirrors that a next VoLTE has been initiated for the same S-TMSI via successful RRC connection setup (C64).

As can be seen on FIG. 6, there is no added value to increase the short inactivity timer as this would ineffectively prolong the UE stay in the RRC Connected state.

Figure 7:
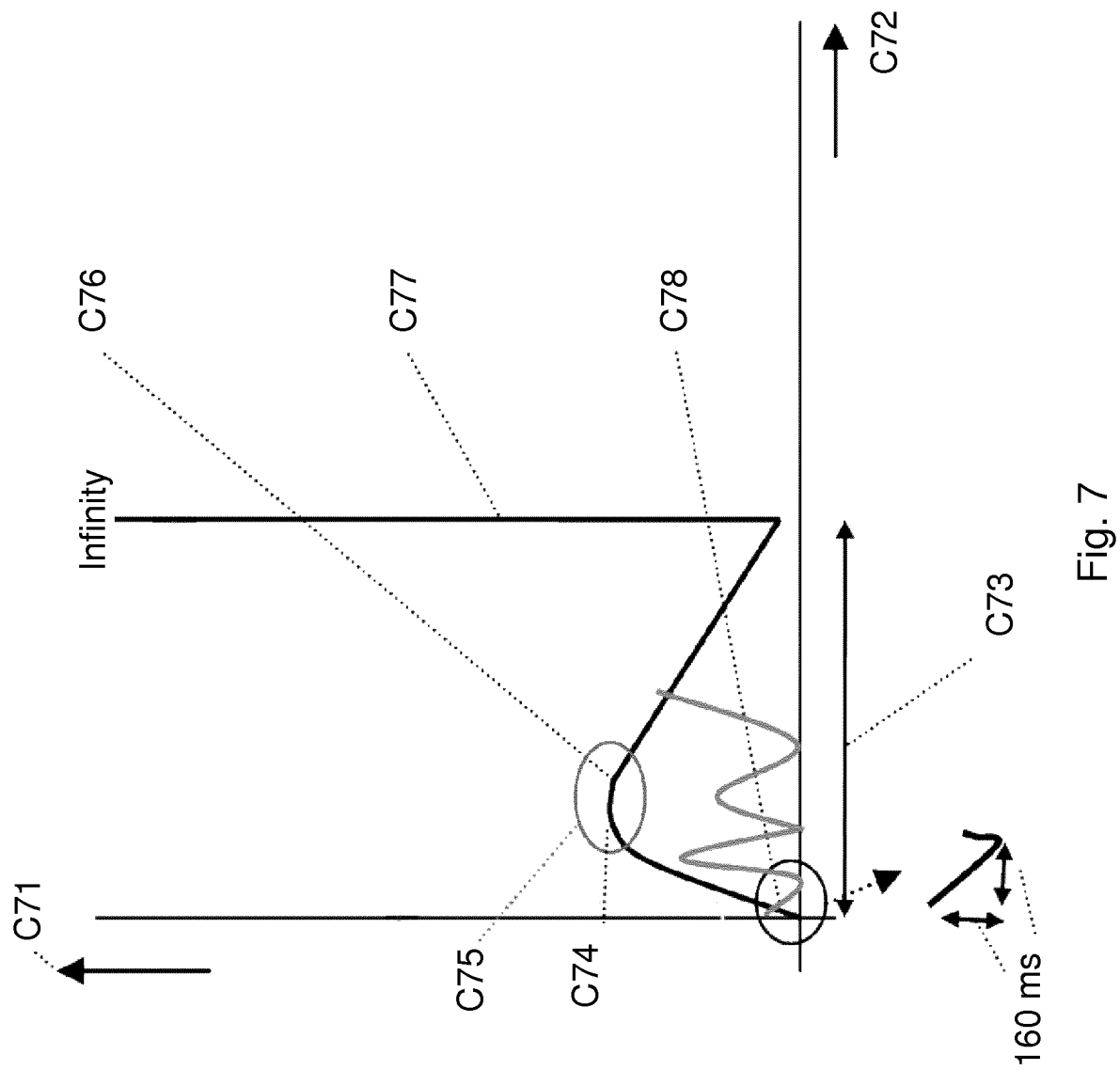
FIG. 7 is a diagram illustrating dependency of time between a successful RRC connection setup and a foregoing data activity on a timer length according to exemplary embodiments of the present invention.

FIG. 7 is a diagram illustrating dependency of time between a successful RRC connection setup and a foregoing data activity on a timer length according to exemplary embodiments of the present invention. In particular, FIG. 7 generally illustrates a principle of short inactivity timer tuning and long inactivity timer tuning according to exemplary embodiments of the present invention, and specifically shows some theoretical extremes marked and a stable area where the short inactivity timer shall be set in view of the theoretic considerations made above (e.g. no Zero seconds timer suitable).

As is derivable from FIG. 7, on the ordinate axis, samples of the time between successful RRC connection setup and last data activity with the same S-TMSI are mapped (C71), while on the abscissa axis, the short inactivity timer is mapped in logarithmic domain (C72). With C73, the time period between two consecutive/consequent VoLTE calls is marked. The upper curve shows the time period between the end of one and start of a next call (C74). Encircled is a stable area into which the short inactivity timer shall be tuned (C75).

Considering that a realistic short inactivity timer value is much smaller than a time period between two consecutive VoLTE calls, any further increase of the short inactivity timer should not significantly change the time between successful RRC connection setup and last data activity with the same S-TMSI (C76).

However, when this value exceeds the time period between the two consecutive calls, the UE may never reach the RRC Idle state (C77).

On the other hand, a very small short inactivity timer setting below 160 ms or even below 20 ms could lead also to very significant reduction of time between successful RRC connection setup and last data activity with the same S-TMSI (C78) whilst also to a significant increase in RRC connection setup attempts.

Figure 8:
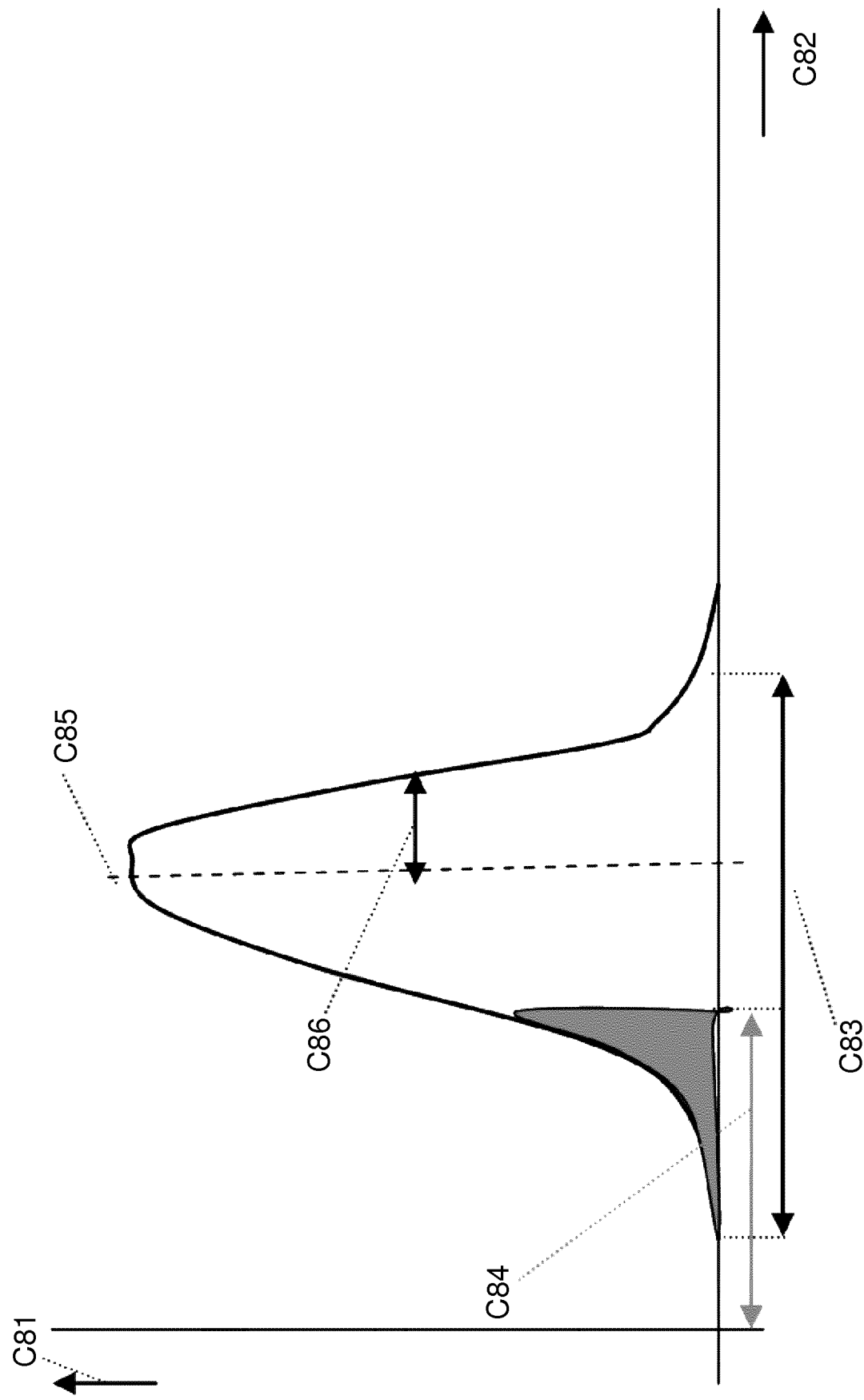
FIG. 8 is a diagram illustrating dependency of a number of movements to RRC Idle state on a time between a successful RRC connection setup and a foregoing RRC connection release according to exemplary embodiments of the present invention.

FIG. 8 is a diagram illustrating dependency of a number of movements to RRC Idle state on a time between a successful RRC connection setup and a foregoing RRC connection release according to exemplary embodiments of the present invention.

In particular, FIG. 8 shows an example of a probability (occurrence) distribution function of the time between successful RRC connection setup and last RRC connection release.

As is derivable from FIG. 8, on the ordinate axis, a number of UE movements to RRC Idle state triggered with the short inactivity timer expiration is mapped (C81), while on the abscissa axis, the time between successful RRC connection setup and last RRC connection release is mapped (C82). With C83, the short inactivity timer value is marked.

A mean value (C85) as well as a standard deviation value (C86) can be derived from the curve shown in FIG. 8.

Calculating the number of UEs' movements to RRC Idle state triggered with the short inactivity timer expiry multiplied with the difference in the default inactivity time value and short inactivity timer value the operator can achieve a total saved time UEs did not have to spend in RRC Connected state which prolongs UE battery life.

Further, for describing the exemplary embodiments of the present invention, now a second type of service like web browsing is considered. As identified above, such second group type has a common characteristic that data transmission is accumulated into smaller time periods the service is active i.e. with long interruptions/pauses between data transmissions. Further, a sufficiently long period between two consecutive services for the same UE is assumed. Such UE shall in respect to the second group type service be assigned with the long inactivity timer for the case the UE does not have any data to transfer.

For these kinds of services it makes sense to set the long inactivity timer to longer values step by step to achieve a state when the inactivity timer exceeds the pause/interruption between the data transmissions which basically transfers this kind of service (with respect to when UE moves to RRC Idle state) to services of the first type.

FIG. 7 also reflects this situation, although it is mainly intended to illustrate the theoretical extremes and a stable area with respect to the short inactivity timer. The only difference is that the interruptions between the data transmissions are much longer than 160 ms and may be on the range of ones or even tens of minutes and they may vary. It is derivable that with a proper long inactivity timer tuning, a first maximum has been obtained (see the first maximum in the wave type curve in FIG. 7). However, further long inactivity timer increase does not necessarily result into infinity in the time between successful RRC connection setup and last RRC connection release but into a second non-infinity local maximum, and continuing further in the long inactivity timer increase may result into some other further maximums as shown in the wave type curve in FIG. 7.

Hence, according to the present invention it is found that it should be possible to prove this expected behavior via monitoring e.g. the probability (occurrence) distribution function of the number (or mean value) of UE movements to RRC Idle state triggered with long inactivity timer expiration relating to the time between successful RRC connection setup and last RRC connection release either via a corresponding histogram or standard deviation.

FIG. 8 also reflects such probability (occurrence) distribution function of the time between successful RRC connection setup and last RRC connection release in relation to second type services. Therefor, with C84, the further increase in the long inactivity timer value by Δ is marked. The only difference with as to first type services is that it applies for the UE movement to RRC Idle state triggered with the long inactivity timer expiry.

Here, it is crucial here in order to decide about further increase in the long inactivity timer to see how this change would reflect a decrease in the RRC Connection setups. An increase in the long inactivity timer by Δ in FIG. 8 will decrease the number of RRC connection setups represented by the number of samples in the filled area.

Figure 9:
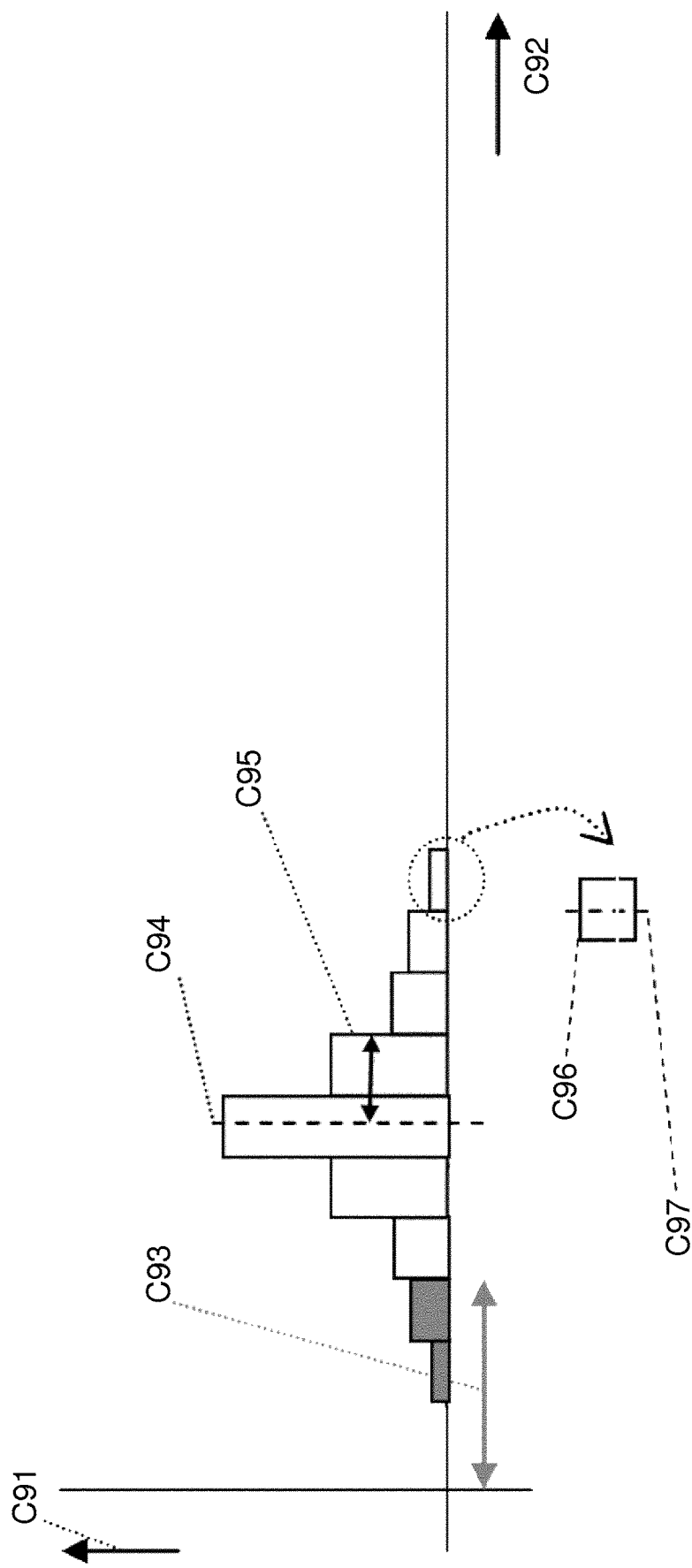
FIG. 9 is a diagram illustrating dependency of a number of movements to RRC Idle state on a time between a successful RRC connection setup and a foregoing RRC connection release according to exemplary embodiments of the present invention.

FIG. 9 is a diagram illustrating dependency of a number of movements to RRC Idle state on a time between a successful RRC connection setup and a foregoing RRC connection release according to exemplary embodiments of the present invention. In particular, FIG. 9 further shows an example of the occurrence distribution function of the time between successful RRC connection setup and last (foregoing) RRC connection release measured via histogram where an increase in the long inactivity timer by Δ would reflect a decrease in the number of RRC connection setups by the number of samples in the marked (filled) first and second bin for this example, and would prolong the UEs stay in RRC Connected state by a total time given as $$X_1 \cdot N_1 + X_2 \cdot N_2 + \sum_{i=3}^{9} (N_i \cdot \Delta). \quad (1)$$

As is derivable from FIG. 9, on the ordinate axis, a number (N) of UE movements to RRC Idle state triggered with the short inactivity timer expiration is mapped (C91), while on the abscissa axis, the time (X) between successful RRC connection setup and last RRC connection release is mapped (C92). With C93, the further increase in the long inactivity timer value by Δ is marked.

Further, a mean value (C94) as well as a standard deviation value (C95) can be derived from FIG. 9.

For the above equation, FIG. 9 also depicts relevant quantities with respect to bins. Namely, $N_i$ is a number auf samples in the i-th bin (C96).

Further, $X_i$ is a middle between successful RRC connection setup and last RRC connection release related to the i-th bin (C97).

Because according to this example discussion for describing exemplary embodiments of the present invention, the decision to increase the long inactivity timer would significantly prolong the time the UEs stay in RRC Connected state and only slightly decrease the number of RRC connection setups, this may be evaluated as of very small benefit obtained for the operator.

In the foregoing example discussion for describing exemplary embodiments of the present invention, short or long inactivity timer selection according to the provided service has been considered, i.e., first group means selection of short inactivity timer and second group means selection of long inactivity timer. However one UE may have established different services in parallel.

Anyhow also in this case, according to exemplary embodiments of the present invention it is still possible to decide on short or long inactivity timer configuration for the UE from the UE's behavior based on the monitoring of the time between successful RRC connection setup and last RRC connection release.

The measures according to exemplary embodiments of the present invention aims to improve the current state by helping network operators to estimate how intended prolongation of the long inactivity timer (as discussed later, these can also be applied to intended adjustment of the short inactivity timer) is going to decrease the number of RRC connection setups on one side and prolong the UEs' state in RRC Connected state on the other side. Measures according to exemplary embodiments of the present invention and principles therebehind can be summarized as follows:

1. According to exemplary embodiments of the present invention, the measures aim to measurement of a histogram as function of the number of successful RRC connection setups and the time between the successful RRC connection setup and last RRC connection release for the UE with the long inactivity timer configured;
2. in relation to point 1, according to exemplary embodiments of the present invention, the histogram may consist of a configurable number of bins;
3. in relation to points 1 and 2, according to exemplary embodiments of the present invention, the bin's width represented by the time between the successful RRC connection setup attempt and last RRC connection release may be configurable;
4. in relation to points 2 and 3, according to exemplary embodiments of the present invention, the number of bins and their width may be configured by operator or in an offline toolset in order to obtain resolution guarantying all important peaks operator should see to tune the long inactivity timer are captured; and
5. in relation to points 1, 2, 3 and 4, according to exemplary embodiments of the present invention, an operator can tune the long inactivity timer in the most effective way to significantly decrease the the number of RRC connection setups on one side and compare it with prolongation of the UEs in RRC connected state on the other side using the above presented Equation (1).

In the RRC connection setup message, the service character cannot be known. Accordingly, there could be the case that the new successful RRC connection setup is for the service belonging to a group different from last released RRC connection. However, but such occurrence is considered as being quite small, such that the impact thereof on the histogram can be ignored.

However, in order to increase accuracy of the proposed measures, according to exemplary embodiments of the present invention, alternatively, the UE context is measured instead of RRC connection while applying the same principles as discussed above, since in UE context the service character can be known. Concretely, this alternative is measurement of the histogram of the number of UE context setups with the QCI belonging to the same group of service/QCI of last released UE context, and the time between the successful UE context setup and last UE context release for the UE with the long inactivity timer configured.

As a side effect, criterion for short or long inactivity timer configuration for the UE can be specified by each network operator independently and thus may differ from operator to operator.

FIG. 1 is a block diagram illustrating an apparatus according to exemplary embodiments of the present invention. The apparatus may be a network node 10 such as a base station comprising a monitoring circuitry 11, a determining circuitry 12, and an adjusting circuitry 13. The monitoring circuitry 11 monitors a communication related state (a state related to a communication). The determining circuitry 12 determines, upon a first state change indicative of a start of a communication, a duration amount of a period between said first state change and a preceding second state change indicative of an end of a preceding communication. The adjusting circuitry 13 adjusts a control value based on a distribution of a plurality of determined duration amounts.

Figure 2:
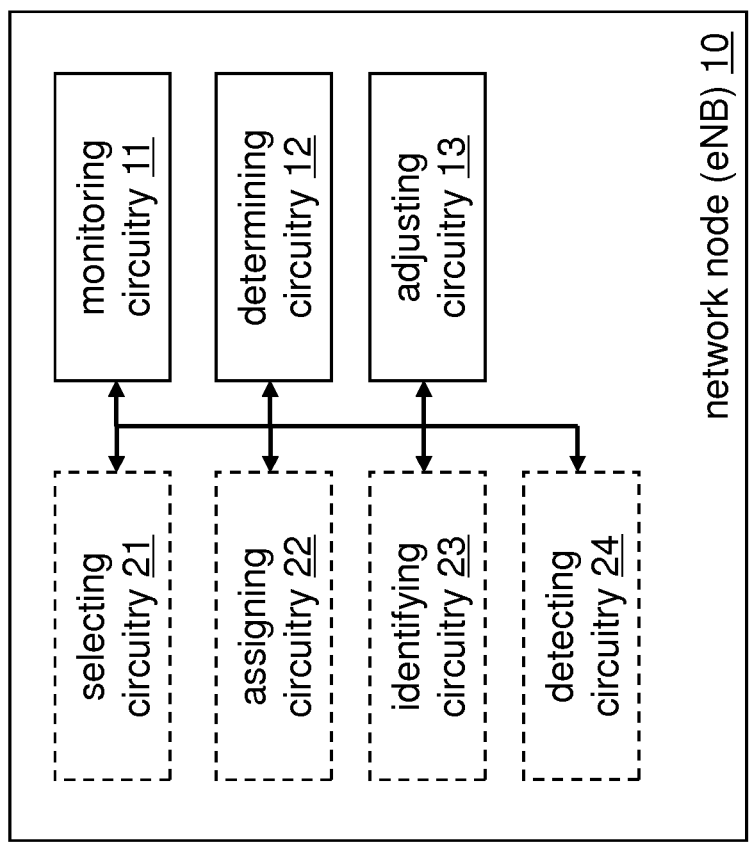
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may (marked with dashed lines) thus further comprise a selecting circuitry 21, an assigning circuitry 22, an identifying circuitry 23, and/or a detecting circuitry 24 with the functionality described below.

In an embodiment at least some of the functionalities of the apparatus shown in FIGS. 1 and/or 2 may be shared between two physically separate devices forming one operational entity. Therefore, the apparatus may be seen to depict the operational entity comprising one or more physically separate devices for executing at least some of the described processes.

Figure 3:
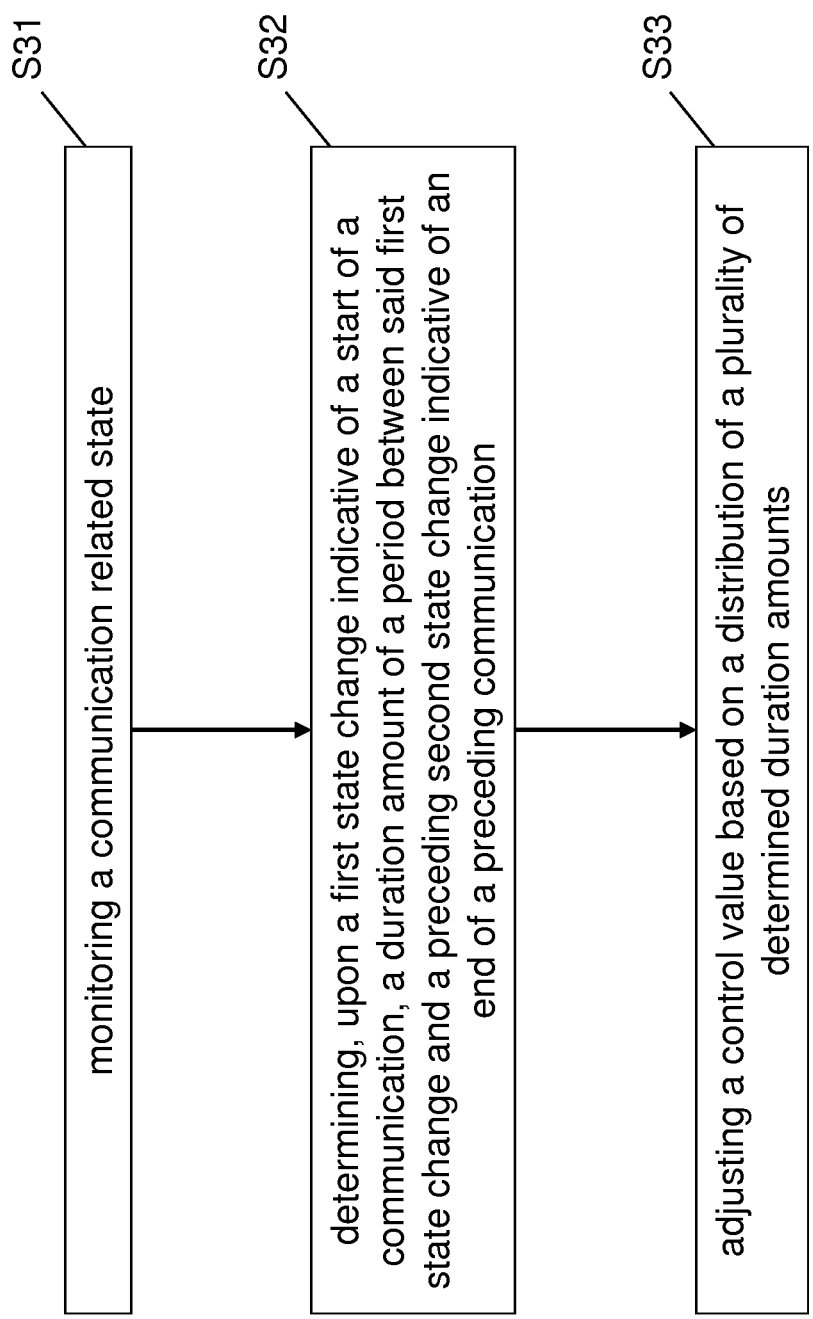
FIG. 3 is a schematic diagram of a procedure according to exemplary embodiments of the present invention.

FIG. 3 is a schematic diagram of a procedure according to exemplary embodiments of the present invention. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to exemplary embodiments of the present invention comprises an operation of monitoring (S31) a communication related state, and operation of determining (S32), upon a first state change indicative of a start of a communication, a duration amount of a period between said first state change and a preceding second state change indicative of an end of a preceding communication, and an operation of adjusting (S33) a control value based on a distribution of a plurality of determined duration amounts.

Figure 4:
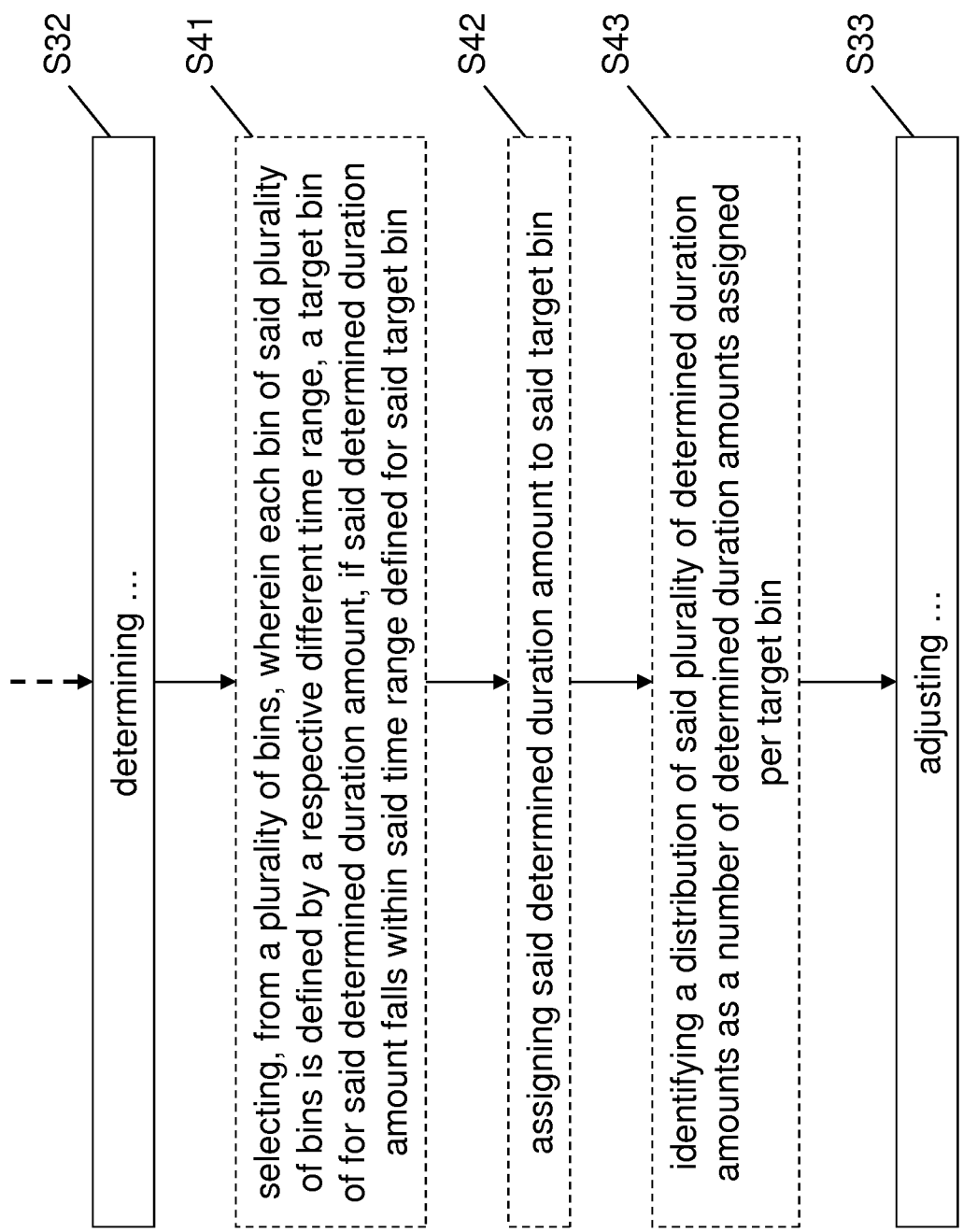
FIG. 4 is a schematic diagram of a procedure according to exemplary embodiments of the present invention.

According to a variation of the procedure shown in FIG. 3, exemplary additional operations are given, which are inherently independent from each other as such. According to such variation (see FIG. 4), an exemplary method according to exemplary embodiments of the present invention may comprise an operation of selecting (S41), from a plurality of bins, wherein each bin of said plurality of bins is defined by a respective different time range, a target bin for said determined duration amount, if said determined duration amount falls within said time range defined for said target bin, and an operation of assigning (S42) said determined duration amount to said target bin.

According to a further variation of the procedure shown in FIG. 3, an exemplary additional operation is given, which is inherently independent from the remaining as such. According to such variation (see FIG. 4), an exemplary method according to exemplary embodiments of the present invention may comprise an operation of identifying (S43) a distribution of said plurality of determined duration amounts as a number of determined duration amounts assigned per target bin.

According to further exemplary embodiments of the present invention, a number of said bins of said plurality of bins is configurable.

According to further exemplary embodiments of the present invention, a width of each respective bin of said plurality of bins corresponding to said respective time range is configurable per said each bin individually.

According to further exemplary embodiments of the present invention, said communication related state is a radio resource connection state.

Figure 5:
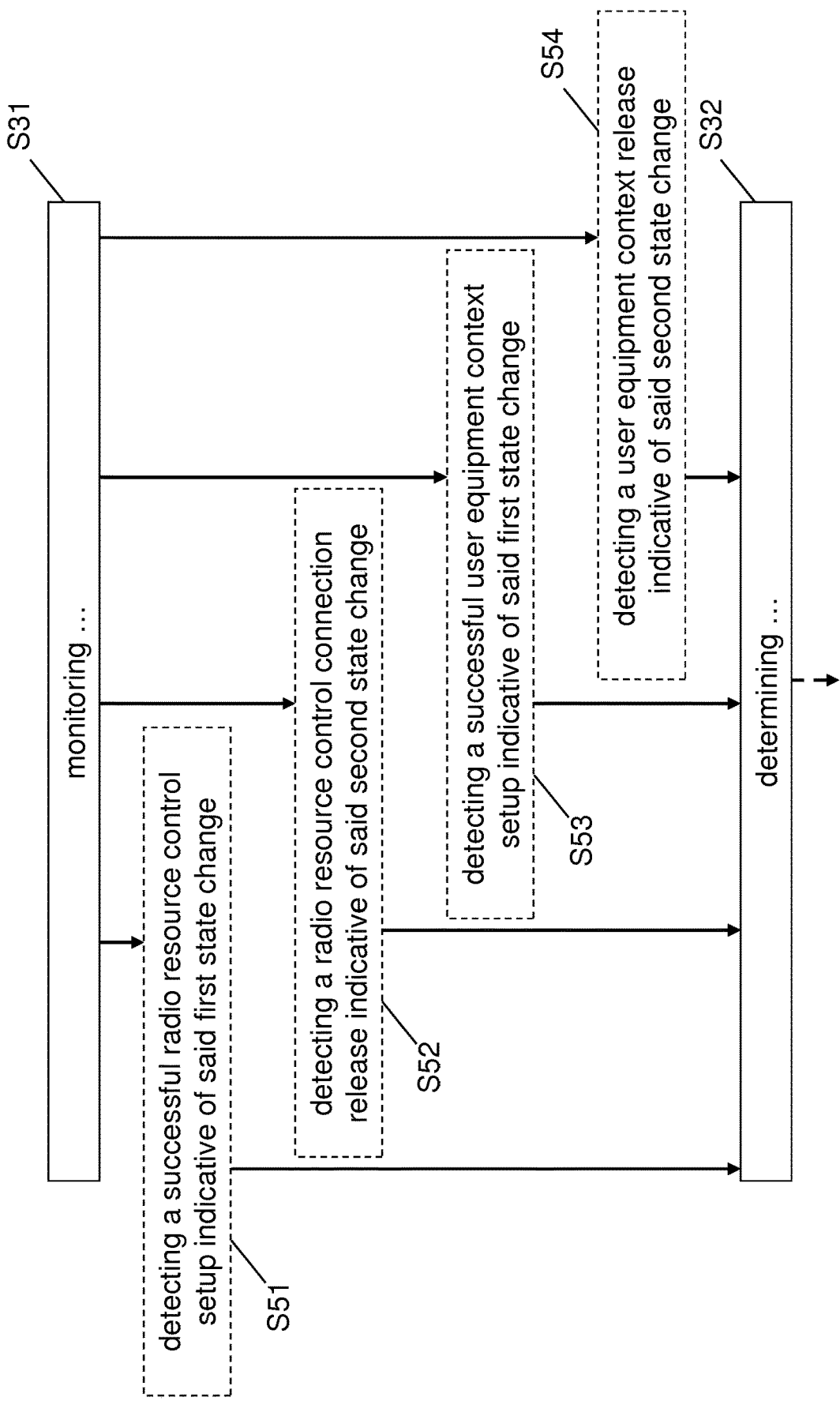
FIG. 5 is a schematic diagram of a procedure according to exemplary embodiments of the present invention.

Further, according to these exemplary embodiments, exemplary additional operations are given, which are inherently independent from each other as such. According to such variation (see FIG. 5), an exemplary method according to exemplary embodiments of the present invention may comprise an operation of detecting (S51) a successful radio resource control setup indicative of said first state change, and an operation of detecting (S52) a radio resource control connection release indicative of said second state change.

According to further exemplary embodiments of the present invention, said communication related state is a user equipment context state.

Further, according to these exemplary embodiments, exemplary additional operations are given, which are inherently independent from each other as such. According to such variation (see FIG. 5), an exemplary method according to exemplary embodiments of the present invention may comprise an operation of detecting (S53) a successful user equipment context setup indicative of said first state change, and an operation of detecting (S54) a user equipment context release indicative of said second state change.

According to further exemplary embodiments of the present invention, said control value is an inactivity timer for triggering a radio resource control idle state.

According to further exemplary embodiments of the present invention, the above discussed performance measurements are implemented within the eNB.

In more concrete terms, according to exemplary embodiments of the present invention (measured RRC connection), a histogram of the number of successful RRC connection setups and the time between successful RRC connection setup and last RRC Connection release is ascertained/measured.

In so doing, below the discussed performance measurements are defined in a format known from 3GPP TS 32.425:
- a) This measurement provides the histogram as function of the number of successful RRC Connection setups and the time between the successful RRC Connection setup attempt and last RRC Connection release for the UE with the same S-TMSI and long inactivity timer configured.
- b) CC.
- c) On receipt by the eNodeB of an RRCConnectionSetupComplete message from the UE. Each RRCConnectionSetupComplete message received is added to the relevant measurement per time bin for the time between the successful RRC connection setup and last RRC Connection release for the UE with the same S-TMSI.
- d) Each measurement is an integer value.
- e) The measurement name has the form RRCConn.Setup.TimeBin where TimeBin identifies the given bin from the histogram
- f) EUtranCellFDD
  EUtranCellTDD
- g) Valid for packet switching.
- h) EPS Alternatively, in the more concrete terms, according to exemplary embodiments of the present invention (measured UE context), a histogram of the number of UE Context setups and time between successful UE Context setup and last UE Context release is ascertained/measured.

In so doing, below the discussed performance measurements are defined in a format known from 3GPP TS 32.425:
- a) This measurement provides the histogram as function of the number of UE Context setups with the QCI the same as last released UE context and the time between the UE Context setup and last UE Context release for the UE with the same S-TMSI and long inactivity timer configured.
- b) CC.
- c) On transmission by the eNodeB of an INITIAL CONTEXT SETUP RESPONSE message with the QCI the same as last released UE context for the UE with the same S-TMSI. Each INITIAL CONTEXT SETUP RESPONSE message transmitted is added to the relevant measurement per time bin for the time between the successful UE context setup and last UE context release with the same QCI for the UE with the same S-TMSI.
- d) Each measurement is an integer value.
- e) The measurement name has the form UECNTX.Setup.Bin where Bin identifies the given bin from the histogram
- f) EUtranCellFDD
  EUtranCellTDD
- g) Valid for packet switching.
- h) EPS As suggested above, the measurement as specified above is not restricted only to monitoring the UEs with long inactivity timer configured. In principle it can also be used for the UEs with short inactivity timer configured.

Figure 10:
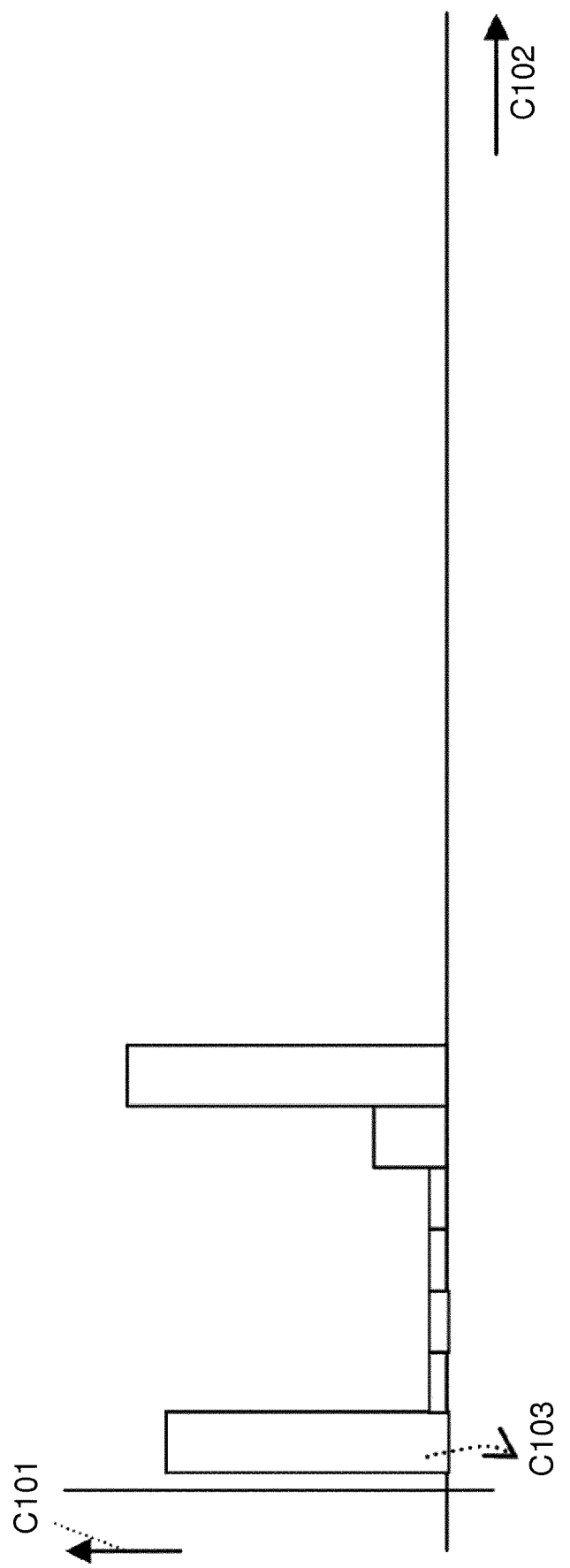
FIG. 10 is a diagram illustrating dependency of a number of movements to RRC Idle state on a time between a successful RRC connection setup and a foregoing RRC connection release according to exemplary embodiments of the present invention.

FIG. 10 is a diagram illustrating dependency of a number of movements to RRC Idle state on a time between a successful RRC connection setup and a foregoing RRC connection release according to exemplary embodiments of the present invention. In particular, FIG. 10 illustrates an example of the above discussed histogram function now related to the short inactivity timer.

That is, FIG. 10 illustrates an example histogram of the time between successful RRC connection setup and last RRC connection release for the UEs with the short inactivity timer configured according to exemplary embodiments of the present invention.

As is derivable from FIG. 10, on the ordinate axis, a number (N) of UE movements to RRC Idle state triggered with the short inactivity timer expiration is mapped (C101), while on the abscissa axis, the time (X) between successful RRC connection setup and last RRC connection release is mapped in logarithmic scale (C102).

Here, a bin is needed to monitor in order to set the short inactivity time above a bottom value (C103) in view of the theoretic considerations made above (e.g. no Zero seconds timer suitable).

The above-described procedures and functions may be implemented by respective functional elements, processors, or the like, as described below.

In the foregoing exemplary description of the network node/entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity/node is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 11:
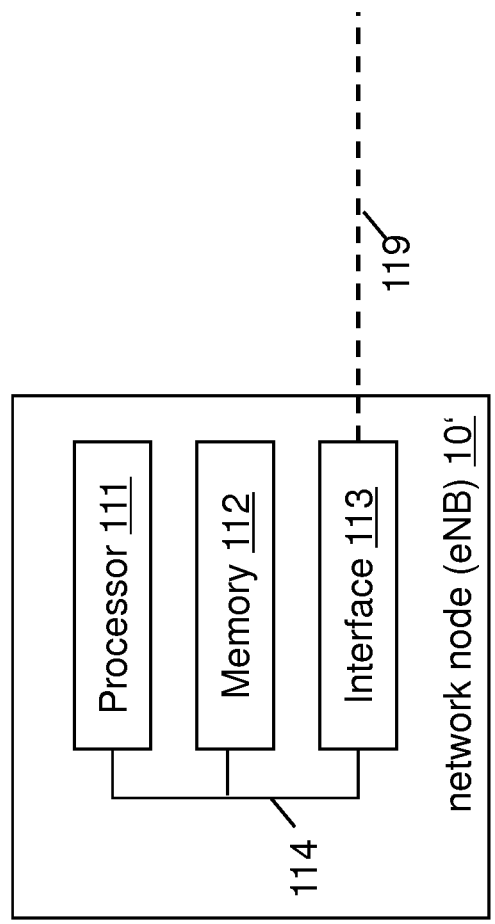
FIG. 11 is a block diagram alternatively illustrating an apparatus according to exemplary embodiments of the present invention.

In FIG. 11, an alternative illustration of apparatuses according to exemplary embodiments of the present invention is depicted. As indicated in FIG. 11, according to exemplary embodiments of the present invention, the apparatus (network node) 10' (corresponding to the network node 10) comprises a processor 111, a memory 112 and an interface 113, which are connected by a bus 114 or the like. The apparatus 10' may be connected via link 119 with another apparatus(es).

The processor 111 and/or the interface 113 may also include a modem or the like to facilitate communication over a (hardwire or wireless) link, respectively. The interface 113 may include a suitable transceiver coupled to one or more antennas or communication means for (hardwire or wireless) communications with the linked or connected device(s), respectively. The interface 113 is generally configured to communicate with at least one other apparatus, i.e. the interface thereof.

The memory 112 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 111, at least one memory 112 including computer program code, and at least one interface 113 configured for communication with at least another apparatus. The processor (i.e. the at least one processor 111, with the at least one memory 112 and the computer program code) is configured to perform monitoring a communication related state (thus the apparatus comprising corresponding means for monitoring), to perform determining, upon a first state change indicative of a start of a communication, a duration amount of a period between said first state change and a preceding second state change indicative of an end of a preceding communication (thus the apparatus comprising corresponding means for determining), and to perform adjusting a control value based on a distribution of a plurality of determined duration amounts (thus the apparatus comprising corresponding means for adjusting).

For further details regarding the operability/functionality of the individual apparatuses, reference is made to the above description in connection with any one of FIGS. 1 to 10, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for inactivity timer evaluation. Such measures exemplarily comprise monitoring a communication related state, determining, upon a first state change indicative of a start of a communication, a duration amount of a period between said first state change and a preceding second state change indicative of an end of a preceding communication, and adjusting a control value based on a distribution of a plurality of determined duration amounts.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

| | |
|---|---|
| 3GPP | 3$^{rd}$ Generation Partnership Project |
| ECM | EPS connection management |
| eNB | evolved NodeB, eNodeB |
| EPC | evolved packet core |
| EPS | evolved packet system |
| E-RAB | evolved radio access bearer |
| E-UTRAN | Evolved UTRAN |
| GBR | guaranteed bit rate |
| LTE | Long Term Evolution |
| LTE-A | LTE Advanced |
| PM | performance management |
| PS | packet switched |
| QCI | QoS class identifier |
| QoS | quality of service |
| RRC | radio resource control |
| SAE | system architecture evolution |
| SID | silent insertion descriptor |
| S-TMSI | SAE-temporary mobile subscriber identity |
| UE | user equipment |
| UMTS | Universal Mobile Telecommunications System |
| UTRAN | UMTS Terrestrial Radio Access Network |
| VoLTE | voice over LTE |

The invention claimed is:

1. A method comprising:
monitoring a radio resource control connection state in a cellular network;
detecting a successful radio resource control connection setup indicative of a first change of the radio resource control connection state indicative of a start of a communication and detecting a radio resource control connection release indicative of a preceding second change of the radio resource control connection state indicative of an end of a preceding communication;
determining, upon said first change of the radio resource control connection state, a plurality of duration amounts of a period between said first change of the radio resource control connection state and said second change of the radio resource control connection state; and
adjusting an inactivity timer configured to trigger a radio resource control idle state based on a distribution of said plurality of determined duration amounts, wherein the inactivity timer is associated with at least one system architecture evolution temporary mobile subscriber identity.

2. The method according to claim 1, further comprising:
selecting, from a plurality of bins, wherein each bin of said plurality of bins is defined by a respective different time range, a target bin for said determined duration amount, if said determined duration amount falls within said time range defined for said target bin; and
assigning said determined duration amount to said target bin.

3. The method according to claim 2, further comprising:
identifying said distribution of said plurality of determined duration amounts as a number of determined duration amounts assigned per target bin.

4. The method according to claim 2, wherein
a number of said bins of said plurality of bins is configurable.

5. The method according to claim 2, wherein
a width of each respective bin of said plurality of bins corresponding to said respective time range is configurable per said each bin individually.

6. An apparatus comprising:
at least one processor;
at least one memory including computer program code; and
at least one interface configured for communication with at least one another apparatus,
the at least one processor, with the at least one memory and the computer program code, being configured to cause the apparatus to perform:
monitoring a radio resource control connection state in a cellular network;
detecting a successful radio resource control connection setup indicative of a first change of the radio resource control connection state indicative of a start of a communication and detecting a radio resource control connection release indicative of a preceding second change of the radio resource control connection state indicative of an end of a preceding communication;
determining, upon said first change of the radio resource control connection state, a plurality of duration amounts of a period between said first change of the radio resource control connection state and said second change of the radio resource control connection state; and
adjusting an inactivity timer configured to trigger a radio resource control idle state based on a distribution of said plurality of determined duration amounts, wherein the inactivity timer is associated with at least one system architecture evolution temporary mobile subscriber identity.

7. The apparatus according to claim 6, wherein
the at least one processor, with the at least one memory and the computer program code, being further configured to cause the apparatus to perform:
selecting, from a plurality of bins, wherein each bin of said plurality of bins is defined by a respective different time range, a target bin for said determined duration amount, if said determined duration amount falls within said time range defined for said target bin; and
assigning said determined duration amount to said target bin.

8. The apparatus according to claim 7, wherein
the at least one processor, with the at least one memory and the computer program code, being further configured to cause the apparatus to perform:
identifying said distribution of said plurality of determined duration amounts as a number of determined duration amounts assigned per target bin.

9. The apparatus according to claim 7, wherein
a number of said bins of said plurality of bins is configurable.

10. The apparatus according to claim 7, wherein
a width of each respective bin of said plurality of bins corresponding to said respective time range is configurable per said each bin individually.

11. A computer program product embodied on a non-transitory computer readable medium, said product comprising computer-executable computer program code which, when the program is run on a computer, is configured to cause the computer to carry out at least the following:
- monitoring a radio resource control connection state in a cellular network;
- detecting a successful radio resource control connection setup indicative of a first change of the radio resource control connection state indicative of a start of a communication and detecting a radio resource control connection release indicative of a preceding second change of the radio resource control connection state indicative of an end of a preceding communication;
- determining, upon said first change of the radio resource control connection state, a plurality of duration amounts of a period between said first change of the radio resource control connection state and said second change of the radio resource control connection state; and
- adjusting an inactivity timer configured to trigger a radio resource control idle state based on a distribution of said plurality of determined duration amounts, wherein the inactivity timer is associated with at least one system architecture evolution temporary mobile subscriber identity.

* * * * *